United States Patent [19]

Feingold

[11] Patent Number: 5,455,763
[45] Date of Patent: Oct. 3, 1995

[54] PROCESS CONTROL METHOD AND DEVICE WHEREIN MODELS OF THE PROCESS AND THE CONTROL SYSTEM ARE USED TO CORRECT AN INPUT SET POINT SIGNAL

[75] Inventor: Jean Feingold, Marly le Roi, France

[73] Assignee: Framatome, Courbevoie, France

[21] Appl. No.: 175,046

[22] Filed: Dec. 29, 1993

[30] Foreign Application Priority Data

Dec. 30, 1992 [FR] France ................... 92 15931

[51] Int. Cl.⁶ ........................................... G05B 13/04
[52] U.S. Cl. ............................... 364/149; 364/162
[58] Field of Search ........................ 364/148–151, 364/176, 178, 162, 153

[56] References Cited

U.S. PATENT DOCUMENTS

| | | |
|---|---|---|
| 4,214,301 | 7/1980 | Kurihara et al. |
| 4,502,109 | 2/1985 | Delmege et al. ............... 364/149 |
| 4,663,703 | 5/1987 | Axelby et al. .................. 364/150 |
| 4,751,443 | 6/1988 | Jackson et al. ................ 364/149 |
| 4,769,766 | 9/1988 | Tung ............................... 364/149 |
| 4,792,737 | 12/1988 | Goff et al. |
| 4,814,968 | 3/1989 | Fukumoto ...................... 364/150 |
| 4,965,713 | 10/1990 | Hong et al. .................... 364/149 |
| 5,034,312 | 7/1991 | Saito .............................. 364/149 |
| 5,060,132 | 10/1991 | Beller et al. .................. 364/150 |
| 5,142,612 | 8/1992 | Skeirik .......................... 364/149 |

FOREIGN PATENT DOCUMENTS

| | | |
|---|---|---|
| 0370327 | 5/1990 | European Pat. Off. . |
| 2426933 | 12/1979 | France . |

OTHER PUBLICATIONS

Japanese Abstracts "Device for Improving Operability of Machine" 57-98004, Jun. 18, 1982.
"Hybrid Simulation of an Aircraft Adaptive Control System" by Halbert, Proceedings of the Fall Joint Computer Cnof., 1963.

Primary Examiner—James P. Trammell
Attorney, Agent, or Firm—Pollock, Vande Sande & Priddy

[57] ABSTRACT

A magnitude such as a liquid level in an industrial process is controlled by a known type control system. Models of the process and the control system ar used to correct an input set point signal [SCN] before it is fed to the control system. The invention applies, for example, to controlling the feed water level in a steam generator of a pressurized water reactor type nuclear power plant boiler.

7 Claims, 2 Drawing Sheets

1

PROCESS CONTROL METHOD AND DEVICE WHEREIN MODELS OF THE PROCESS AND THE CONTROL SYSTEM ARE USED TO CORRECT AN INPUT SET POINT SIGNAL

The present invention concerns the control of a magnitude featured in an industrial process such as a physical or chemical quantity or a computer parameter.

BACKGROUND OF THE INVENTION

It is generally known to apply a set point signal applied to a control system which compares the set point signal with a process output signal to control an actuator acting on the magnitude to be controlled which is measured by the process output signal. This control system may conventionally include proportional, integral and/or derivative channels. It may also have a time-delay function.

Even with these optimally controlled actions this known method cannot always limit as much as desirable errors between the process output signal and the set point signal, especially if the values of a variable magnitude other than the magnitude to be controlled, called an "external" magnitude hereinafter, are imposed on the process independently of the set point signal.

There are known applications of this general method to the specific instance where the magnitude to be controlled is the feed water level in a steam generator associated with a pressurized water reactor in a nuclear power station. To be more precise the, FR 2 312 728 describes a steam generator feed water inlet flowrate control device. This device can provide good control of the feed water flowrate at low power outputs.

FR 2 426 933 discloses another steam generator water level control method. This method achieves good control of the water level during the transient stage when the power station is commissioned.

These two documents concern relatively stable operation of the steam generator. This is the situation in electrical power stations which operate under steady state conditions and usually at virtually 100% of the rated output. However is very different from an industrial process in which the operation of these steam generators is subject to transient conditions manifested in major variations in an "external" magnitude imposed on the process. Such variations affect the flowrate of steam required from the generator in the case of variations in the power required from the power station, for example. In this case, the known control devices respond by opposing induced variations that these variations in the external magnitude tend to impose on a magnitude to be controlled, such as the water level in the steam generator. However, they are unable to prevent controlled.

SUMMARY OF THE INVENTION

An object of the present invention is to limit the errors that can arise between the current value of a magnitude to be controlled featured in a process and a set point value defined for the same magnitude by a set point signal, especially in the presence of strong and/or rapid variations in an external magnitude also imposed on the process. Such errors can be limited in respect of their absolute maximum value, amplitude, number and/or frequency of oscillations and/or duration.

To this end, the invention consists in a method of controlling a process by means of a control system wherein models of the process and the control system are used to correct an input set point signal before it is fed to the control system.

If an external magnitude is imposed on the process outside the control system said models are responsive to an external signal representing the external magnitude.

To be more precise, in accordance with the invention, and complementing the aforementioned known general method, a model is established of a heterogeneous system consisting of the process and its control system. This composite model is adapted to supply a model output signal homologous to the process output signal in response to the current and previous values of a model control set point signal homologous to the set point signal mentioned with reference to the known general method and referred to hereinafter as the process control set point signal. The model control set point signal is fed to an input of the composite model.

In this context, homologous means that the response of the model, represented by the model output signal, to the current and previous values of the model control set point signal and to those of one or more external signals must be similar to the response of the heterogeneous system, represented by the process output signal, to the current and previous values of the process control set point signal and the same external signals. In the case of electronic circuits, at least these responses can be conveniently represented by transfer functions. Generally speaking, in the present context two units are homologous if they have similar or identical transfer functions and are incorporated in the same way into two larger systems themselves made up of homologous units. Two signals are homologous if they are received or supplied by two homologous units.

In accordance with the invention the process and model output signals are compared to generate a model error signal. This is used to correct in two opposite correction directions an input set point signal of the device. This forms the process control set point signal and the model control set point signal, respectively. The correction directions are those which tend to reduce the difference between the process and model output signals.

Within the composite model, a process model is chosen which exhibits a behavior constituting a required improvement, and advantageously a simplification, of the process. On the other hand, the transfer functions of the units of the model control system are preferably chosen to be identical to those of the homologous units of the process control system. The process control system and the composite model then constitute an adaptive system which causes the response of the process to tend towards that of the model, in particular with the aim of improving control stability and performance.

BRIEF DESCRIPTION OF THE DRAWINGS

How the present invention may be put into effect will now be described with reference to the accompanying drawings, it being understood that the units and devices mentioned and shown are mentioned and shown by way of example only. If a unit is shown in more than one figure, it is identified by the same reference symbol in all of them.

DETAILED DESCRIPTION

Figure 1:
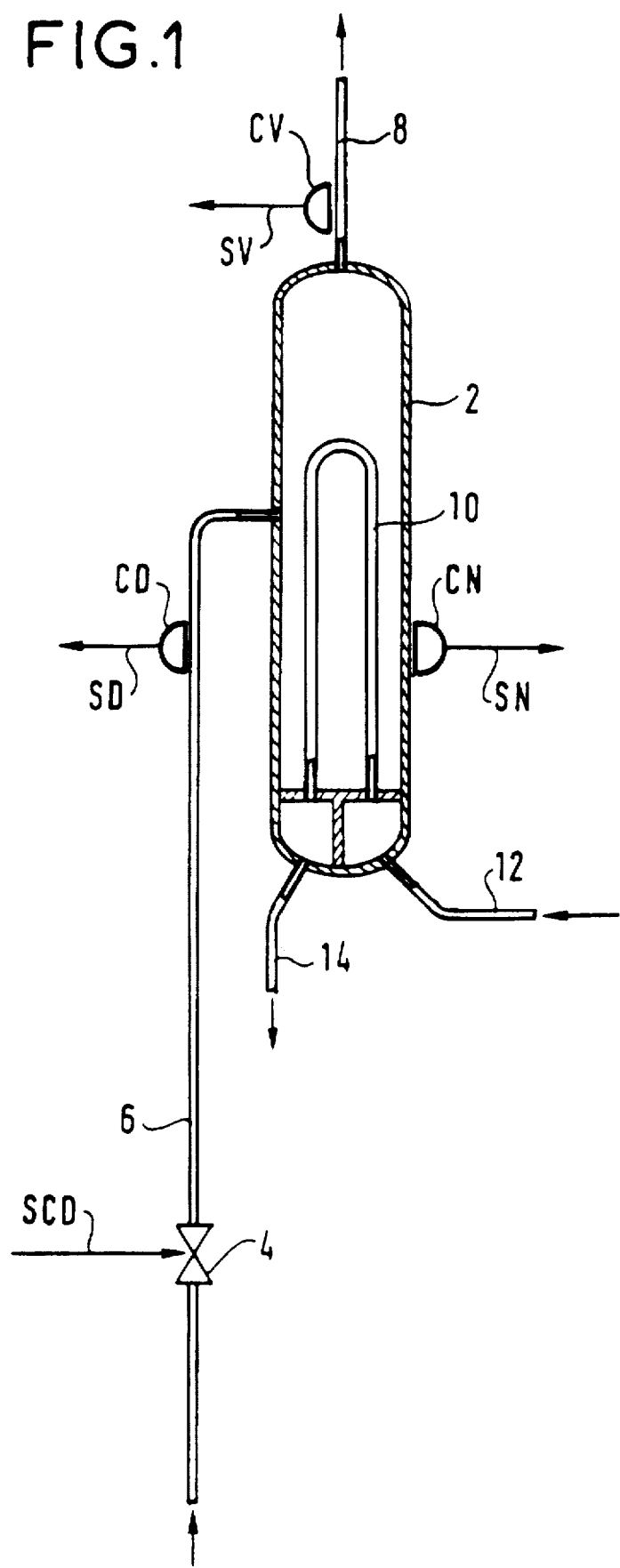
FIG. 1 shows a steam generator of a pressurized water nuclear reactor boiler.

The industrial process according to the invention applies to is the operation of a nuclear power station steam generator 2, shown in FIG. 1. The generator includes internal heat exchanger tubes 10 carrying pressurized primary water heated in a closed circuit in the core (not shown) of a nuclear reactor. The primary water arrives from the reactor core via an inlet pipe 12 and returns to the core via an outlet pipe 14.

A fluid in the form of feed water reaches the steam generator via a pipe 6 constituting a control passage. The generator constitutes a container for this water in which it has to reach a possibly variable level in its liquid state. When it contacts the heat exchanger tubes 10, the water is converted to steam which leaves the generator via a second passage in the form of a steam pipe 8. This pipe conveys the steam to the turbine (not shown) of a turbo-alternator whence it is extracted to a condenser (not shown) and then returned to the pipe 6 via a control valve 4 which controls its flowrate. This valve constitutes an actuator of the process. It is controlled by a process control signal SCD.

The flowrate of the water through this valve and entering the generator 2 is represented by a process flowrate signal SD supplied by a flowrate sensor CD. A level sensor CN supplies a process output signal SN representing the level of the feed water in the generator 2. A second flowrate sensor CV supplies a second flowrate signal SV representing the steam flowrate leaving the generator 2 via the pipe 8. The algebraic value of this signal SV is taken as negative hereinafter, whereas that of the signal SD is taken as positive because flowrates entering the generator are taken as positive and those leaving it as negative.

Figure 2:
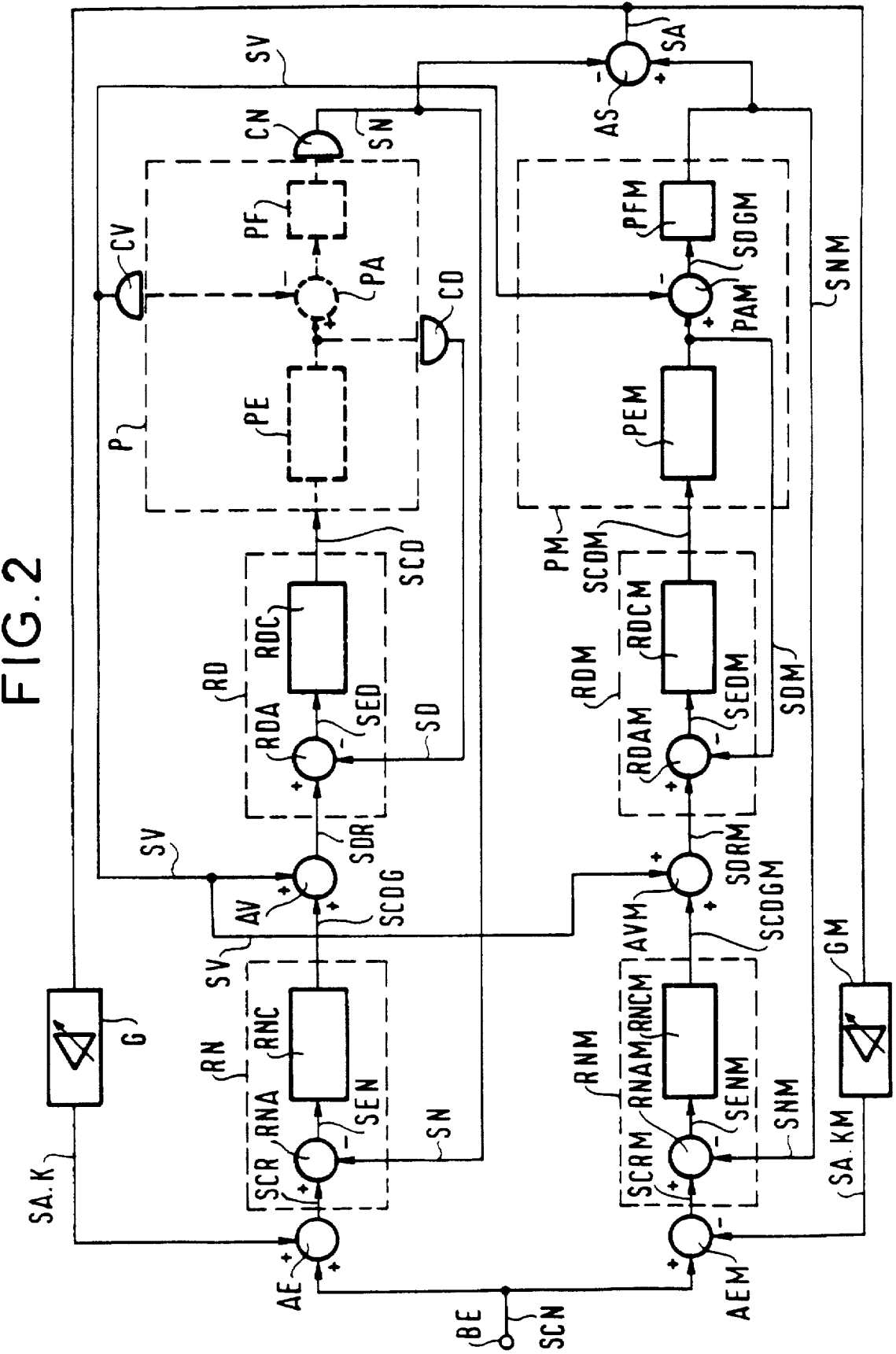
FIG. 2 shows a device in accordance with the invention used to control the feed water level in this steam generator.

A process control device is described, initially in general terms, with reference to FIG. 2. This device includes the following units which are known in respect of their functions as stated:

An input terminal BE to receive an input set point signal SCN representing a set point value to be assigned to a magnitude to be controlled. This magnitude features in an industrial process P. Its current value depends on influencing parameters which include at least the previous and current values of a process control signal SCD applied to an actuator 4 of the process.

An output sensor CN supplying a process output signal SN representing the current value of the magnitude to be controlled.

A process control system RN, AV, RD made up of signal processing circuits and receiving a process control set point signal SCR subject to variations which represent variations in said input set point signal SCN. The control system also receives at least the process output signal SN. It processes previous and current values of the signals that it receives to produce the process control signal SCD so as to limit current and future errors between the set point and current values of the magnitude to be controlled.

According to the invention, the control device further includes a system model made up of signal processing circuits and including:

A process model PM receiving a model control signal SCDM and signals SV representing any and all influencing parameters other than the values of the process control signal SCD. The model processes the signals that it receives to supply a model output signal SNM whose value after and in the presence of previous and current values of the model control signal evolves in a similar manner to the value that the process output signal SN would have assumed after and in the presence of previous and current values of the process control signal if the latter values had been respectively equal to the previous and current values of the model control signal.

A model control system RNM, AVM, RDM receiving a model control set point signal SCRM, the model output signal and any signal SV, etc. received by process control system other than the process control and process output signals. The model control system processes previous and current values of the signals that it receives to supply the model control signal SCDM whose value after and in the presence of previous and current values of the model control set point signal and model output signal evolves in a manner similar to the value that the process control signal SCD would have assumed after and in the presence of previous and current values of the process control set point signal and process output signal if the latter values had been respectively equal to the previous and current values of the model control set point signal and model output signal.

The control device further includes:

An output comparator AS receiving the process output signal SN and model output signal SNM and supplying a model error signal SA representing a model error SNM−SM between the model output signal and the process output signal.

A process control corrector comprising an amplifier G and an adder AE. This corrector receives the model error signal SA. It applies to it a process correction gain K and adds it algebraically to the input set point signal SCN. In this way, it forms the process control set point signal SCR=SCN+K.SA. This forms a process correction feedback loop tending to reduce the error between the process output signal SN and the model output signal SNM.

A model control corrector comprising an amplifier GM and an adder AEM. This corrector receives the model error signal SA. It applies to it a model correction gain KM and adds it algebraically to the input set point signal SCN. In this way, it forms the model control set point signal SCRM=SCN−KM.SA. This forms a model correction feedback loop tending to reduce the error between the model output signal SNM and the process output signal SN.

The model correction gain KM is preferably greater than the process correction gain K.

The process model PM has transfer functions which are improvements and preferably simplifications of those of the industrial process P. On the other hand, the units of the model control system RNM, AVM, RDM have transfer functions identical to those of the homologous units of the process control system RN, AV, RD, respectively.

To be slightly more specific, the magnitude to be controlled is a level to which a container 2 is filled with a fluid occupying the interior volumes of the container, this level being, for example, the pressure of a gas or the level of the surface of a liquid. The actuator 4 controls the flowrate of the fluid through a control passage 6 at the inlet-outlet of the container and constituting a control flowrate. The control device further includes a control flowrate sensor CD supplying a process control flowrate signal SD representing the control flowrate.

The process control system is then made up of units referred to hereinafter as "process" units, in that they are closely associated with the process P. These units form a process level controller RN and a process flowrate controller RD.

The process level controller RN includes a process level comparator RNA receiving the process output signal representing the level and the process control set point signal SCR. This comparator supplies a process level error signal SEN representing the error between the process output signal and the process control set point signal. The controller RN then includes a process level control circuit RNC including at least one proportional, integral, derivative and/or time-delay channel. This circuit receives the process level error signal SEN and supplies a process overall flowrate set point signal SCDG representing a required overall flowrate of the fluid at the inlet-outlet of the container. This flowrate is that required to limit current and future errors.

The process flowrate controller RD includes a process flowrate comparator RDA receiving the process control flowrate signal SD and a control flowrate set point signal SDR formed from the process overall flowrate set point signal SCDG. This comparator supplies a process flowrate error signal SED representing an error between the process control flowrate signal and the process control flowrate set point signal.

The controller RD then includes a process flowrate control circuit RDC including at least one proportional, integral, derivative and/or time-delay channel. This circuit receives the process flowrate error signal SED and supplies in response thereto the process control signal SCD.

The model control system is made up of model units homologous to the process units of the process control system to receive, process and supply model signals homologous to the process signals received, processed and supplied by the respective process units. These model units include a model level controller RNM and a model flowrate controller RDM.

The model level controller RNM includes a model level comparator RNAM receiving firstly a model level signal SNM consisting of the model output signal and secondly the model control set point signal SCRM. This comparator supplies a model level error signal SENM representing the error between the model level signal and the model control set point signal. The controller RNM then includes a model level control circuit RNCM including at least one proportional, integral, derivative and/or time-delay channel. This circuit receives the model level error signal SENM and supplies a model overall flowrate set point signal SCDGM.

The model flowrate controller RDM includes a model flowrate comparator RDAM receiving a model control flowrate signal SDM supplied by the process model PM in response to the model control signal SCDM. The process model forms the signal SDM in such a way that this response constitutes a simulation of the action of the process control signal SCD on the process control flowrate signal SD in the process P. This comparator also receives a model control flowrate set point signal SDRM formed from the model overall flowrate set point signal SCDGM. It supplies a model flowrate error signal SEDM representing the error between the model control flowrate signal and the model control flowrate set point signal.

The model flowrate controller RDM then includes a model flowrate control circuit RDCM including at least one proportional, integral, derivative and/or time-delay channel. This circuit receives the model flowrate error signal SEDM and supplies in response to it the model control signal SCDM.

The present invention finds an advantageous application when container 2 has a second fluid inlet-outlet passage 8. A second flowrate sensor CV is then provided for supplying a second flowrate signal −SV representing a flowrate of the fluid through the second passage and constituting a second flowrate. The algebraic sum of the control flowrate and the second flowrate then constitutes a process overall flowrate.

In this case, in accordance with the present invention, the process model PM includes:

A flowrate model PEM receiving the model control signal SCDM and processing it to simulate the action of the process control signal SCD on the process control flowrate signal via the actuator 4, the control flowrate and the control flowrate sensor CD. The flowrate model supplies in response the model control flowrate signal SDM.

A model flowrate adder PAM adding algebraically the model control flowrate signal SDM and the second flowrate signal −SV to supply a model overall flowrate signal SDGM.

A model flowrate integrator circuit PFM processing the model overall flowrate signal to simulate the action of the process overall flowrate on the process output signal SN. This action of the process overall flowrate is exercised via: initially the filling level resulting from past values of the overall flowrate and the internal volumes of container 2, and thereafter the response of the level sensor CN to this filling level, to supply the process output signal.

The model flowrate integrator circuit PFM supplies the model output signal SNM as a result of the processing that it performs on the model overall flowrate signal SDGM. It may be a filter with an appropriate time constant.

The model units PEM, PAM and PFM may be regarded as representing functions implemented in the process P and symbolized by the process units PE, PA and PF respectively homologous to these model units. It must be understood, however, that (as in this example) these process units could be virtual units, only the functions that they represent featuring in the process. For this reason, these virtual process units are shown in dashed line.

The process control system RN, AV, RD preferably further includes a process flowrate set point corrector AV receiving the process overall flowrate set point signal SCDG and algebraically subtracting therefrom the second flowrate signal −SV to supply the process control flowrate set point signal SDR=SCDG+SV.

The model control system RNM, AVM, RDM then further includes a model flowrate set point corrector AVM receiving the model overall flowrate set point signal SCDGM and algebraically subtracting therefrom the second flowrate signal −SV to supply the model control flowrate set point signal SDRM=SCDGM+SV.

For example, the container is the steam generator 2, the magnitude to be controlled is the generator feed water level, the control flowrate is the feed water flowrate into the generator via the pipe 6 and the second flowrate is the flowrate of steam extracted from the generator via the pipe 8.

I claim:

1. Process control device including:
   an input terminal to receive an input set point signal [SCN] representing a set point value to be assigned to a magnitude to be controlled which features in an industrial process and a current value of which depends on influencing parameters which include at least the previous and current values of a process control signal applied to an actuator of the process, an output sensor to supply a process output signal representing said current value of the magnitude to be controlled, and a process control system made up of signal processing circuits and receiving a process control set point signal [SCR] subject to variations which represent variations in said input set point signal [SCN], the control system also receiving at least said process output signal and processing previous and current values of the signals that it receives to produce said process control signal so as to limit current and future errors between said set point values and the current value of said magnitude to be controlled, said control device further including a system model made up of signal processing circuits and including:

a process model, receiving a model control signal and signals [SV] representing any and all influencing parameters other than said values of the process control signal, the model processing the signals that it receives to supply a model output signal [SNM] whose value after and in the presence of previous and current values of the model control signal evolves in a similar manner to the value that said process output signal would have assumed after and in the presence of previous and current values of said process control signal if the latter values had been respectively equal to said previous and current values of the model control signal, and a model control system receiving a model control set point signal [SCRM], said model output signal and any signal [SV] received by said process control system other than said process control and process output signals, the model processing previous and current values of the signals that it receives to supply said model control signal whose value after and in the presence of previous and current values of said model control set point signal and model output signal evolves in a similar manner to the value that said process control signal would have assumed after and in the presence of previous and current values of said process control set point signal and process output signal if the latter values had been respectively equal to said previous and current values of the model control set point signal and model output signal, said control device further including:

an output comparator receiving said process output signal and model output signal [SNM] and supplying a model error signal [SA] representing a model error [SNM−SM] between the model output signal and the process output signal, a process control corrector receiving said model error signal [SA] and applying to it a process correction gain [K] and adding it algebraically to said input set point signal [SCN] to form said process control set point signal [SCR=SCN+K.SA] to form a process control feedback loop tending to reduce the error between said process output signal and said model output signal [SNM], and a model control corrector receiving said model error signal [SA] and applying to it a model correction gain [KM] and adding it algebraically to said input set point signal [SCN] to form said model control set point signal [SCRM=SCN−KM.SA] to form a model control feedback loop tending to reduce the error between said model output signal [SNM] and said process output signal.

2. Device according to claim 1, wherein said model correction gain [KM] is greater than said process correction gain [K].

3. Device according to claim 1, wherein said process model has transfer functions which are improvements on those of said industrial process, the units of said model control system having transfer functions identical to those of the homologous units of said process control system, respectively.

4. Device according to claim 1, wherein said magnitude to be controlled is a level to which a container is filled with a fluid occupying the interior volumes of the container, said actuator controlling the flowrate of the fluid through a control passage at the inlet-outlet of the container and constituting a control flowrate, said control device further including a control flowrate sensor supplying a process control flowrate signal representing the value of said control flowrate, said process control system being made up of process units including a process level controller including:

a process level comparator receiving said process output signal and said process control set point signal [SCR] and supplying a process level error signal representing the error between the process level signal and the process control set point signal, and a process level control circuit including at least one proportional, integral, derivative and/or time-delay channel, this circuit receiving said process level error signal and supplying a process overall flowrate set point signal [SCDG] representing an overall flowrate of said fluid at the inlet-outlet of said container required to limit said current and future errors, said process units of the process control system further including a process flowrate controller including:

a process flowrate comparator receiving said process control flowrate signal and a process control flowrate set point signal [SDR] formed from said process overall flowrate set point signal [SCDG], the comparator supplying a process flowrate error signal representing an error between the process control flowrate signal and the process control flowrate set point signal, and a process flowrate control circuit including at least one proportional, integral, derivative and/or time-delay channel and receiving said process flowrate error signal and supplying in response thereto said process control signal, said model control system being made up of model units homologous to said process units of said process control system to receive, process and supply model signals homologous to said process signals received, processed and supplied by the respective process units, the model units including a model level controller including:

a model level comparator receiving firstly a model level signal [SNM] consisting of said model output signal and secondly said model control set point signal [SCRM] and supplying a model level error signal representing the error between the model level signal and the model control set point signal, and a model level control circuit including at least one proportional, integral, derivative and/or time-delay channel, this circuit receiving said model level error signal and supplying a model overall flowrate set point signal [SCDGM], said model units of the model control system further including a model flowrate controller including:

a model flowrate comparator receiving firstly a model control flowrate signal supplied by said process model in response to said model control signal so that said response constitutes a simulation of the action of said process control signal on said process control flowrate signal in said process and secondly a model control flowrate set point signal [SDRM] formed from said model overall flowrate set point signal [SCDGM], the comparator supplying a model flowrate error signal representing the error between the model control flowrate signal and the model control flowrate set point signal, and a model flowrate control circuit including at least one proportional, integral, derivative and/or time-delay channel, this circuit receiving said model flowrate error signal and supplying in response to it said model control signal.

5. Device according to claim 4, said container having a second fluid inlet-outlet passage and a second flowrate sensor for supplying a second flowrate signal [−SV] representing a flowrate of said fluid through the second passage and constituting a second flowrate, the algebraic sum of said control flowrate and the second flowrate constituting a process overall flowrate, wherein said process model includes:

a flowrate model receiving said model control signal and processing it to simulate the action of said process control signal on said process control flowrate signal via said actuator, said control flowrate and said control flowrate sensor, the flowrate model supplying in response said model control flowrate signal, a model flowrate adder adding algebraically said model control flowrate signal and said second flowrate signal [−SV] to supply a model overall flowrate signal, and a model flowrate integrator circuit processing said model overall flowrate signal to simulate the action of said process overall flowrate on said process output signal via said filling level resulting from past values of the overall flowrate and said internal volumes of said container and thereafter the response of said level sensor to this filling level to supply said process output signal, the model flowrate integrator circuit supplying said model output signal [SNM] as a result of this processing.

6. Device according to claim 5, wherein said process control system further includes a process flowrate set point corrector receiving said process overall flowrate set point signal [SCDG] and algebraically subtracting therefrom said second flowrate signal [−SV] to supply said process control flowrate set point signal [SDR=SCDG+SV], said model control system further including a model flowrate set point corrector receiving said model overall flowrate set point signal [SCDGM] and algebraically subtracting therefrom said second flowrate signal [−SV] to supply said model control flowrate set point signal [SDRM=SCDGM+SV].

7. Device according to claim 6, wherein said container is a steam generator in a nuclear power plant boiler, said magnitude to be controlled is a generator feed water level, said control flowrate is a feed water flowrate into the generator and said second flowrate is a flowrate of steam extracted from the generator and fed to a steam user external to said power plant boiler.

* * * * *